(12) United States Patent
Ballantine et al.

(10) Patent No.: US 8,715,470 B2
(45) Date of Patent: May 6, 2014

(54) SEPARATOR PLATES, ION PUMPS, AND HYDROGEN FUEL INFRASTRUCTURE SYSTEMS AND METHODS FOR GENERATING HYDROGEN

(75) Inventors: Arne W. Ballantine, Round Lake, NY (US); David C. Kirchhoff, Portner Corners, NY (US); James F. McElroy, Suffield, CT (US); Michael P. Gordon, Troy, NY (US)

(73) Assignee: Honda Motor Co., Ltd., Tokyo (JP)

( * ) Notice: Subject to any disclaimer, the term of this patent is extended or adjusted under 35 U.S.C. 154(b) by 1117 days.

(21) Appl. No.: 12/705,738

(22) Filed: Feb. 15, 2010

(65) Prior Publication Data
US 2010/0176003 A1 Jul. 15, 2010

Related U.S. Application Data

(62) Division of application No. 10/952,372, filed on Sep. 28, 2004, now Pat. No. 7,686,937.

(51) Int. Cl.
*H01M 8/02* (2006.01)

(52) U.S. Cl.
USPC ............ 204/256; 204/258; 204/277; 204/278

(58) Field of Classification Search
USPC .................................. 204/256, 258, 277, 278
See application file for complete search history.

(56) References Cited

U.S. PATENT DOCUMENTS

| | | |
|---|---|---|
| 6,168,705 B1 | 1/2001 | Molter et al. |
| 6,200,698 B1 | 3/2001 | Carlstrom, Jr. |
| 6,280,865 B1 | 8/2001 | Eisman et al. |
| 6,309,773 B1 * | 10/2001 | Rock .............................. 429/443 |
| 6,500,580 B1 | 12/2002 | Marvin et al. |
| 2002/0106541 A1 | 8/2002 | Yamada et al. |

(Continued)

FOREIGN PATENT DOCUMENTS

| | | |
|---|---|---|
| EP | 1077499 | 2/2001 |
| EP | 1109241 | 6/2001 |

(Continued)

OTHER PUBLICATIONS

Sedlak, et al.: "Hydrogen Recovery and Purification Using the Solid Polymer Electrolyte Electrolysis Cell," J. Hydrogen Energy, vol. 6, 45-51 (1981).

(Continued)

*Primary Examiner* — Arun S Phasge
(74) *Attorney, Agent, or Firm* — Nelson Mullins Riley & Scarborough LLP; Anthony A. Laurentano (57) ABSTRACT

Anode and cathode separator plates are suitable for use in ion pumps for converting an input stream such as reformate into a pressurized and purified hydrogen-rich gas stream. The plates may include a single cathode outlet opening forming a portion of cathode output gas manifold, an anode inlet opening forming a portion of an inlet gas stream manifold and being sized larger than inlet cathode outlet opening, the distance of the anode inlet opening to an edge of the plate being less than the distance of the cathode outlet opening from an edge of the plate, and the size of the fluid flow channel of the anode separator plate being smaller than the size of the fluid flow channel of the cathode separator plate. Methods for forming the plates and infrastructure systems are also disclosed.

19 Claims, 5 Drawing Sheets

(56) References Cited

U.S. PATENT DOCUMENTS

| | | |
|---|---|---|
| 2003/0157387 A1 | 8/2003 | Hase et al. |
| 2006/0054512 A1 | 3/2006 | Ballantine et al. |
| 2006/0065520 A1 | 3/2006 | Ballantine et al. |

FOREIGN PATENT DOCUMENTS

| | | |
|---|---|---|
| EP | 1235289 | 8/2002 |
| WO | 0041260 | 7/2000 |
| WO | 03071625 | 8/2003 |
| WO | 2006/036606 | 6/2006 |

OTHER PUBLICATIONS

Search Report for WO 2006/036606, Honda Motor Co., Ltd., 6-pages, Apr. 6, 2006.

* cited by examiner fig. 1

SEPARATOR PLATES, ION PUMPS, AND HYDROGEN FUEL INFRASTRUCTURE SYSTEMS AND METHODS FOR GENERATING HYDROGEN

CROSS-REFERENCE TO RELATED APPLICATION

This patent application is a divisional of U.S. patent application Ser. No. 10/952,372, filed Sep. 28, 2004, entitled "Separator Plates, Ion Pumps, And Hydrogen Fuel Infrastructure Systems And Methods For Generating Hydrogen," the entire subject matter of this application being incorporated herein by reference.

FIELD OF THE INVENTION

This invention relates generally to ion pumps, and more particularly, to separator plates and ion pumps for generating hydrogen and other gases.

BACKGROUND OF THE INVENTION

Hydrogen is an important zero emission fuel. Recently, development of hydrogen fuel infrastructure systems has become a priority to support the use of hydrogen as a fuel.

An important part of a hydrogen fuel infrastructure system is generation of hydrogen. Two methods are generally used for generating hydrogen. One method for generating hydrogen includes an electrolysis process, which uses electrical energy to split water molecules into hydrogen and oxygen. Another method for generating hydrogen includes a reforming process, e.g., converting hydrocarbon fuel such as natural gas or propane into a hydrogen-rich gas.

In each of these methods, the product of the generation process is often an impure, low-pressure stream that contains hydrogen gas as one of many constituents. With either method, the hydrogen is often purified, dried, and/or compressed for use or storage.

There is a need for further improvements in separator plates and ion pumps for purifying and pressurizing gases such as hydrogen.

SUMMARY OF THE INVENTION

The present invention provides in a first aspect, an anode separator plate for use in an ion pump in which the anode separator plate includes a planar member comprising an anode inlet opening extending through the planar member forming a portion of an input gas stream manifold, at least one fluid flow channel disposed on a first surface of the planar member and connectable at one end to the anode inlet opening, and a single cathode outlet opening extending through the planar member forming a portion of a cathode output manifold.

The present invention provides in a second aspect, an anode separator plate for use in an ion pump having a low-pressure input gas stream and a high-pressure output gas stream in which the anode separator plate includes a planar member having an anode inlet opening extending through the planar member forming a portion of a low-pressure input gas stream manifold, at least one fluid flow channel disposed on a first surface of the planar member and connectable at one end to the anode inlet opening, a cathode outlet opening extending through the planar member forming a portion of a high-pressure cathode output gas stream manifold, and wherein the anode inlet opening comprises a first size, the cathode outlet opening comprises a second size, and the first size being larger than the second size.

The present invention provides in a third aspect, a cathode separator plate for use in an ion pump in which the cathode separator plate includes a planar member having a single cathode outlet opening extending through the planar member forming a portion of a cathode output gas stream manifold, and at least one fluid flow channel disposed on a first surface of the planar member and connectable at one end to the cathode outlet opening.

The present invention provides in a fourth aspect, a cathode separator plate for use in an ion pump having a low-pressure input gas stream and a high-pressure output gas stream in which the cathode separator plate includes a planar member having a cathode outlet opening extending through the planar member forming a portion of a high-pressure cathode output gas stream manifold, at least one fluid flow channel disposed on a first surface of the planar member and connectable at one end to the cathode outlet opening, an anode inlet opening extending through the planar member forming a portion of a low-pressure input gas stream manifold, and wherein the anode inlet opening comprises a first size, the cathode outlet opening comprises a second size, and wherein the first size being larger than the second size.

The present invention provides in a fifth aspect a pair of separator plates for use in an ion pump in which the pair of separator plates includes an anode separator plate and a cathode separator plate. The anode separator plate includes a planar member having an anode inlet opening extending through the planar member forming a portion of an input gas stream manifold, and at least one fluid flow channel disposed on a first surface of the planar member and connectable at one end to the anode inlet opening. The cathode separator plate includes a planar member having a cathode outlet opening extending through the planar member forming a portion of a cathode output gas stream manifold, and at least one fluid flow channel disposed on a first surface of the planar member and connectable at one end to the cathode outlet opening. The at least one fluid flow channel of the anode separator plate comprises a first distance between adjacent lands, the at least one fluid flow channel of the cathode separator plate comprises a second distance between adjacent lands, and wherein the first distance is less than the second distance.

The present invention provides in other aspects, ion pumps and hydrogen fuel infrastructure systems incorporating the above-mentioned plates.

The present invention provides in still other aspects, methods for forming the above-mentioned plates, and methods for producing pressurized hydrogen using ion pumps incorporating the above-mentioned plates.

BRIEF DESCRIPTION OF THE DRAWINGS

The subject matter which is regarded as the invention is particularly pointed out and distinctly claimed in the concluding portion of the specification. The invention, however, may best be understood by reference to the following detailed description of various embodiments and accompanying drawings in which:

DETAILED DESCRIPTION OF THE INVENTION

Figure 1:
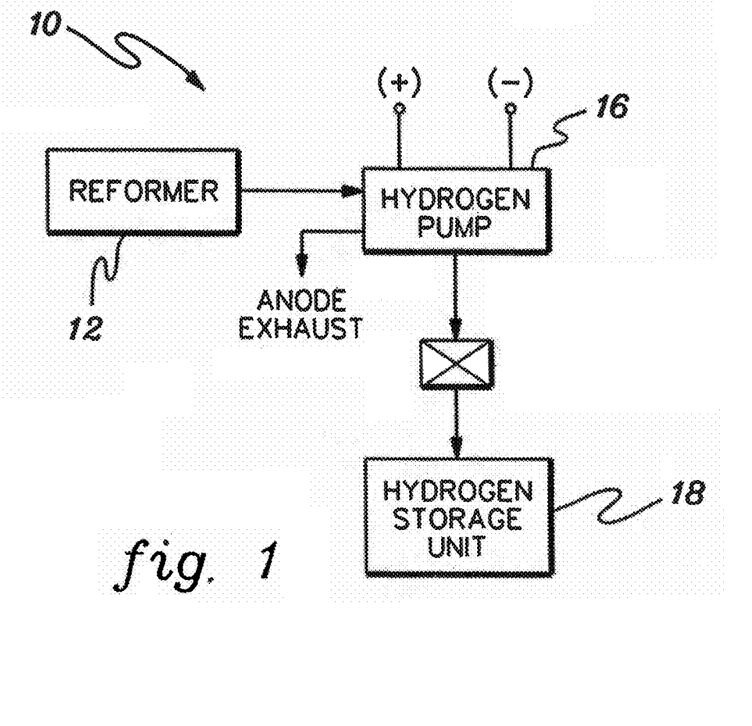
FIG. 1 is a diagrammatic illustration of a hydrogen infrastructure system in accordance with the present invention.

FIG. 1 is an example of one embodiment of a hydrogen infrastructure system 10 in accordance with the present invention which may include a reformer 12 such as a catalytic partial oxidation (CPO) reformer, a steam reformer, or an autothermal reformer for converting a hydrocarbon such as methane or methanol into a hydrogen-rich gas stream, an ion pump such as a hydrogen pump 16, and a hydrogen storage unit 18.

As described in greater detail below, the hydrogen pump is operable to convert the input stream such as reformate into a pressurized and purified hydrogen-rich gas stream. The pressurized and purified hydrogen-rich gas stream can be used directly in, e.g., a fuel cell (not shown), or can be stored in a pressurized gas container such as hydrogen storage unit 18. While the hydrogen generation system is described in conjunction with use in fuel cells, it will be appreciated by those skilled in the art that the hydrogen generating system may also be used in industrialization of processes which utilize gases (e.g., hydrogen and oxygen) for materials microstructure processing such as in the semiconductor industry.

As also described in greater detail below, the hydrogen pump in accordance with one aspect of the present invention may include anode separator and cathode separator plates having various features which result in a compact, efficient hydrogen pump operable to produce a pressurized and purified hydrogen-rich gas stream.

Figure 2:
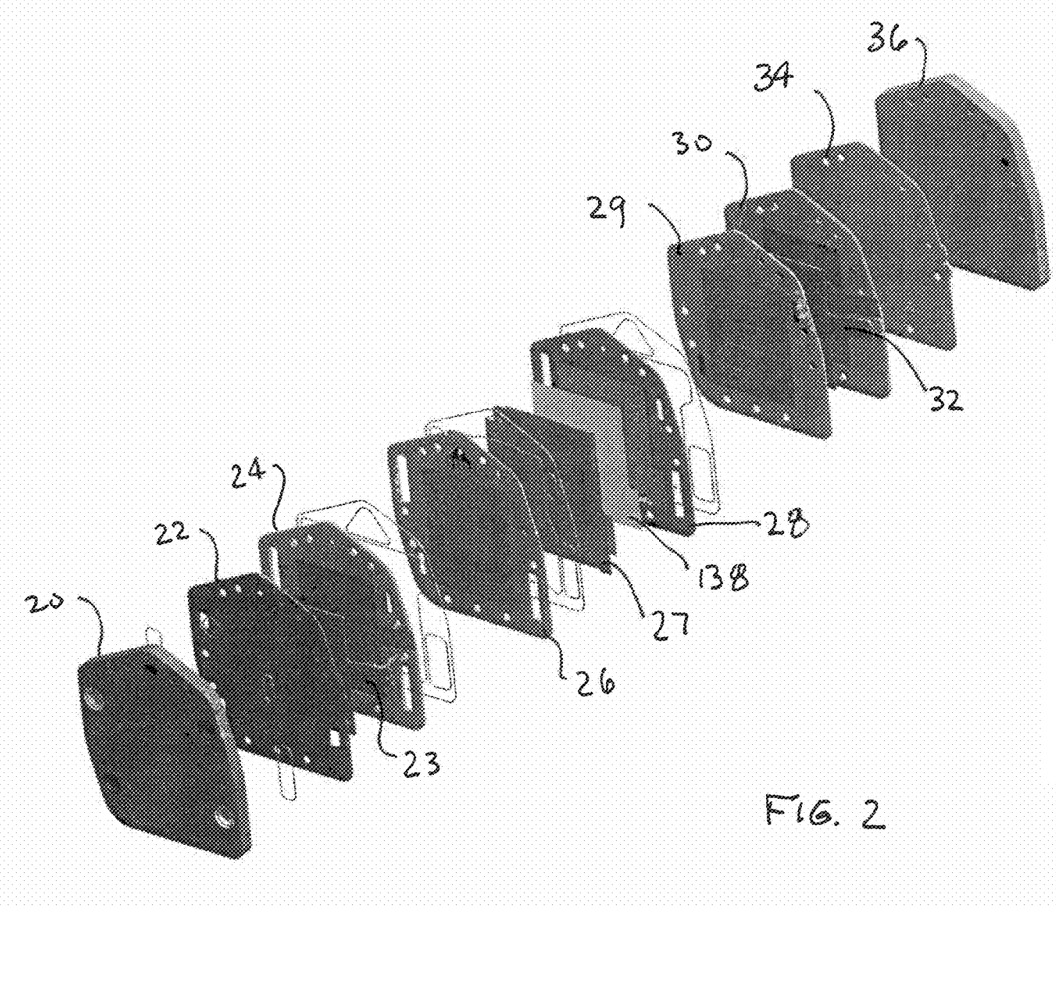
FIG. 2 is an exploded view of a portion of the hydrogen pump of FIG. 1.

FIG. 2 illustrates one embodiment of hydrogen pump 16 in accordance with the present invention for use in the hydrogen infrastructure system 10 of FIG. 1. While the hydrogen pump is illustrated as including one proton electrical chemical cell, it will be appreciated by those skilled in the art that hydrogen pumps in accordance with the present invention may comprise a plurality of or a stack of proton conducting electrochemical cells for electrochemical gas pumping.

Hydrogen pump 16 is operable for separating, removing, and/or compressing pure hydrogen from an input supply containing hydrogen such as reformate. Exemplary hydrogen pump 16 may include an end plate 20, insulator plate 22, a collector plate 23, a collector pocket plate 24, a cathode separator plate 26, an electrochemical cell 27, anode support screen 138, an anode separator plate 28, a blind cooler blank plate 29, a collector pocket plate 30, a collector plate 32, an insulator plate 34, and an end plate 36.

Figure 3:
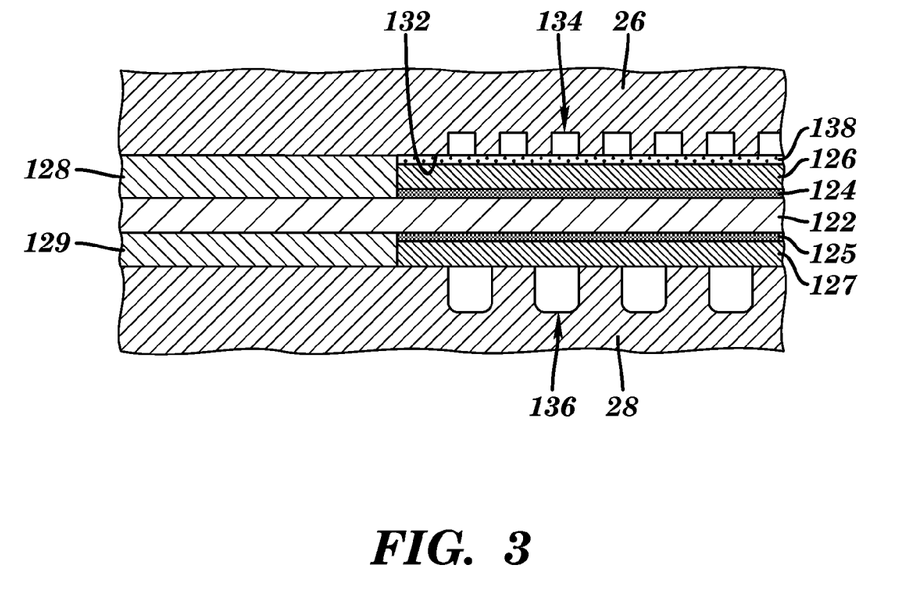
FIG. 3 is a cross-sectionals view of a portion of the hydrogen pump of FIG. 2.

With reference to FIG. 3, the electrochemical cell may include a solid polymer membrane 122 or PEM (proton exchange membrane) such as a material manufactured by E. I. Du Pont de Nemours Company and sold under the trademark NAFION. Catalysts 124 and 125 (e.g., platinum), which facilitate chemical reactions, are desirably applied to the anode and cathode sides, respectively, of the solid polymer electrolyte. Anode and cathode gas diffusion layers 126 and 127, which are formed from a resilient and conductive material such as a carbon fabric or carbon fiber paper, are disposed on catalysts 124 and 125, respectively.

Anode separator plate 28 includes a fluid flow surface 132 with a plurality of flow channels 134 thereon. Flow channels 134 receive and conduct a low-pressurized input gas stream through an inlet and out an outlet which are in fluid communication with and open onto corresponding manifolds as described in greater detail below. Flow channels 134 may carry, for example, the input gas stream such as reformate, as well as a liquid, e.g., humidification.

Cathode separator plate 26 includes a plurality of flow channels 136 for collecting, for example, a pressurized and purified hydrogen-rich gas stream.

As described in greater detail below, the low-pressure input gas stream is provided to the anode side while the cathode side is driven to a higher pressure. To prevent the anode gas diffusion layer 126 from being crushed into the fluid flow channel 134, anode support screen 138, as shown in FIG. 3, may be disposed between anode fluid flow surface 132 and gas diffusion layer 126. In addition, flow channels 134 of the anode separator plate may be sized with a smaller span between the lands compared to the span between the lands of the cathode separator plate 26 to reduce the distance the gas diffusion need to bridge and the likelihood of the gas diffusion layer being crushed into the anode fluid flow channels. For example, the distance between the lands forming the fluid flow channels in the anode separator plate may be about 0.030 inch, and the distance between the lands forming the fluid flow channels in the cathode separator plate may be about 0.040 inch. The depth of the fluid flow channels in the anode separator plate may be about 0.017 inch, and the depth of the cathode fluid flow channels may be about 0.014 inch. In addition, a suitable number of flow channels in the anode separator plate may be provided to reduce the pressure drop of the input gas between the anode inlet opening (FIG. 6) and the anode outlet opening (FIG. 6).

Gaskets 128 and 129 may be employed to seal the electrical chemical cell from the various openings forming manifolds in the separator plates. Additional gaskets, shown in FIG. 2, may be provided for suitably sealing the various portions of the hydrogen pump. The gaskets may include a frame gasket made from a polytetrafluoroethylene (PTFE) material manufactured by E. I. Du Pont de Nemours Company and sold under the trademark TEFLON. Alternatively, multiple gaskets may be employed. For the gasket surrounding the cathode fluid flow channel, which as described below is operated at a higher pressure, a double set of gaskets may be provided to reduce the likelihood of leaks compared to a single gasket.

Figures 4, 6:
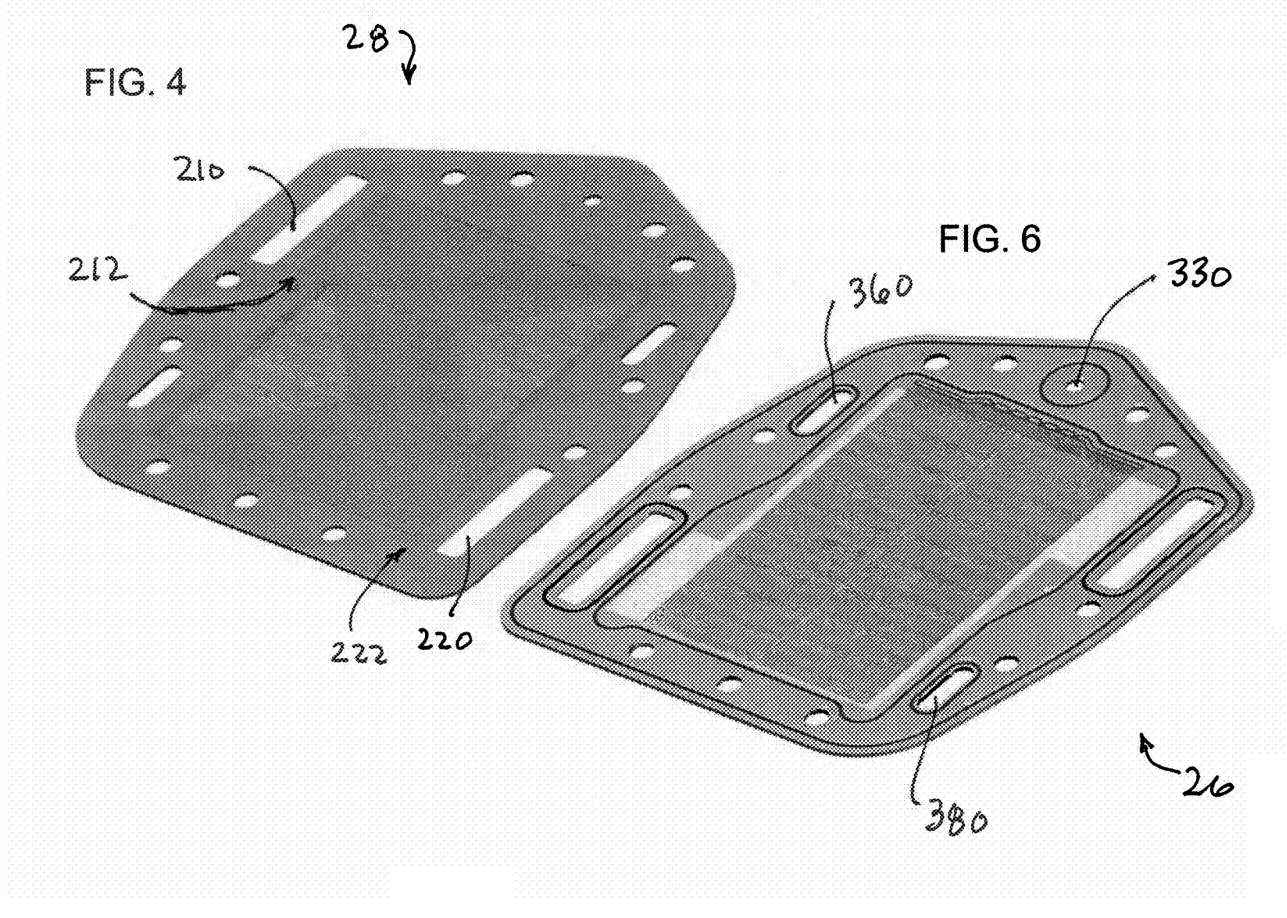
FIG. 4 is a perspective plan view of a front side of the anode separator plate of FIG. 2 having a plurality of fluid flow channels for distributing an input gas stream.
FIG. 6 is a perspective plan view of a front side of the cathode separator plate of FIG. 2 having a plurality of fluid flow channels for exhausting a hydrogen-rich gas stream.
Figures 5, 7:
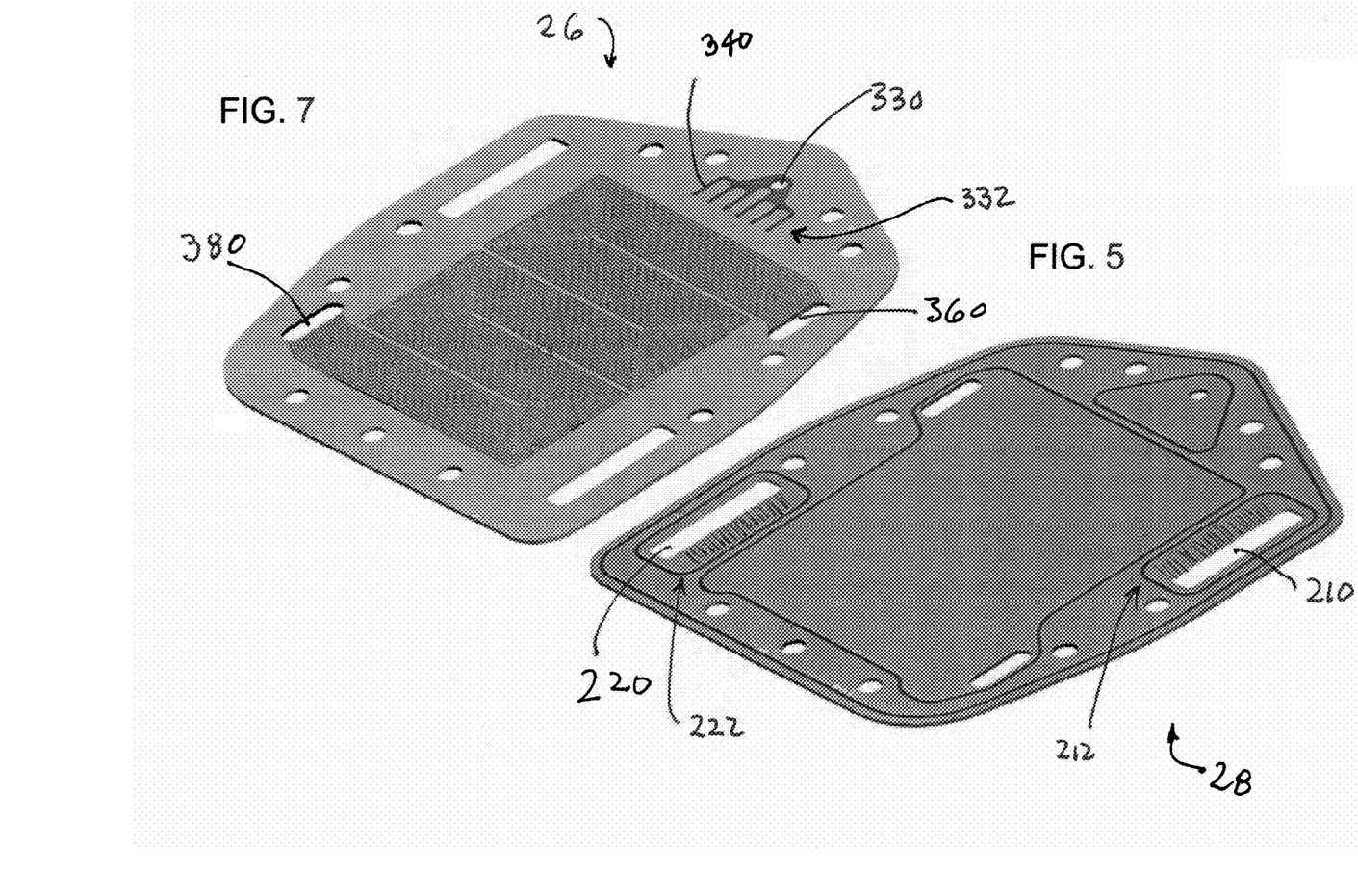
FIG. 5 is a perspective plan view of a rear side of the anode separator plate of FIG. 4.
FIG. 7 is a perspective plan view of a rear side of the cathode separator plate of FIG. 6 having a plurality of coolant fluid flow channels.

With reference to FIGS. 4 and 5, anode separator plate 28 may include a relatively large-sized opening 210 for forming a portion of an internal inlet gas stream manifold for the low-pressure input gas. Since, in some uses, the hydrogen pump cannot utilize all of the input gas, a relatively large-sized outlet opening 220 may be provided for forming a portion of an outlet gas stream manifold. This allows impurities in the input gas stream to be removed. Openings 210 and 220 may also have a relatively large size to provide a low resistance to flow and reduced pressure drop between the openings. In other embodiment, a single inlet opening may be provided wherein the anode is deadheaded (e.g., no anode exhaust). In still other embodiments, the input gas stream may be periodically exhausted to remove impurities, e.g., bleeding the anode inlet, recirculating exhaust, and/or purging exhaust into the atmosphere or into a tank. A valve may be employed for controlling the exhaust from the anode inlet.

The fluid flow surface of anode separator plate 28 may include a plurality of serpentine flow channels 134 having equal length to result in an equal pressure drop during operation. A plurality of dive-through holes 212 and 222 may be provided to connect the anode inlet opening and the anode outlet opening, respectively, to the flow channels. Dive-through holes are described in U.S. Pat. No. 6,500,580 to Marvin, et al., entitled "Fuel Cell Fluid Flow Plate for Promoting Fluid Service", the entire subject matter of which is incorporated herein by reference. The opposite side of the anode separator plate may be relatively flat, e.g., not including fluid flow channels.

With reference to FIGS. 6 and 7, cathode separator plate 26 may include a cathode outlet opening 330, and desirably a single cathode outlet opening, for forming an internal manifold for discharge of the high-pressure hydrogen-rich gas stream. Cathode outlet opening 330 may have a relatively small size to provide some resistance to flow, e.g., some pressure drop, and capable of withstanding the high gas pressures as described below.

As there is only an output of product gas, a cathode inlet opening is not needed, i.e., only a single opening forming a portion of a manifold for the product gas stream is needed. One advantage of a single cathode outlet opening is that it results in an increase in the ratio of active area of the cathode separator plate compared to the total surface area of the cathode separator plate.

The cathode separator plate may also include straight parallel flow channels which cover the active area of the electrical chemical cell, and a dive-through hole region 332 (FIG. 7) which connects the fluid flow channels to cathode outlet 330. The connecting fluid flow channels 340 (FIG. 7) may have a shallower depth compared to the fluid flow channels in the active region to reduce separator plate stress near the cathode output opening.

The opposite side of cathode separator plate 26, best shown in FIG. 7, may include a plurality of coolant flow channels connected to a coolant input opening 360 and a coolant output opening 380 for regulating the temperature of the ion pump. In the illustrated embodiment, coolant fluid flow channels may be provided on the cathode separator plate and not on the anode separator plate. Desirably, the coolant fluid flow channels are disposed and extend over the rear portion of the cathode separator plate which corresponds to the active area of the electrochemical cell thereby maintaining a generally constant temperature across the entire active region. Coolant fluid may include water, air, propylene, or ethylene glycol.

The various manifolds may be arranged with the cathode outlet manifold physically separated from the other manifolds to reduce the likelihood of the cathode outlet manifold leaking into the coolant or the input gas manifolds. In addition, leakage from the cathode outlet manifold, which is separated from the other manifolds, may be more easily detected. For example, for a generally square or rectangular separator plate, the cathode outlet opening may be positioned adjacent to one side of the separator plate and the anode inlet opening or anode outlet opening may be positioned adjacent to a different side, e.g., opposite sides, or on sides generally 90-degrees from each other.

From the present description, it will be appreciated by those skilled in the art that other configurations of the separator plates, manifolds, and flow channels may also be suitably employed which incorporate the features of the present invention. For example, coolant fluid flow channels may be provided on the rear side of the anode separator plate. In addition, the features of the present invention may be incorporated in bipolar separator plate, e.g., where the separator plate includes anode fluid flow channels on one side and cathode fluid flow channels on the other side. If radiative cooling is used, then coolant channels and manifolds may not be needed.

With reference again to FIG. 2, tie bolts (not shown) may pass through holes adjacent the edges in the various plates and extend from end plate 20 to end plate 36. Tie bolts may be positioned at locations away from the corners of the plates to reduce bending or other unequal forces being applied to the plates. Desirably, a compressive force on the hydrogen pump is greater than the desired pressure of the output product gas stream. In the fabrication of the hydrogen pump, the hydrogen pump may have an applied stack compression pressure of between about 25 psi and about 1,000 psi, and preferably, between about 100 psi and about 600 psi.

The end plates, for example, may be flat and about 1-inch or thicker. In addition, the end plate may be pre-stressed or pre-bended such that when the stack is at pressure, the end plate bends so that the surface presented to the inner side of the end plate is essentially flat. It is also possible that the end plates may contain a bladder device to create compression in a planar fashion. An example, of a suitable end plate is disclosed in U.S. Pat. No. 6,200,698 to Carlstrom, Jr., entitled "End Plate Assembly having a Two-Phase Fluid-Filled Bladder and Method for Compressing a Fuel Cell Stack," the entire subject matter of which is incorporated herein by reference. Another option is to make the end plates large and place the tie bolts outside the plates, e.g., not through the plates.

The hydrogen pump may be operated with the input gas stream and the coolant maintained at low pressure and having a low pressure drop across the inlets and outlets thereby allowing use of a low energy blower for the input gas and a low energy pump for the coolant fluid.

In addition to the anode inlet opening and anode outlet opening being sized larger than the cathode outlet opening, due to the pressure difference between the low pressure anode input gas stream and high pressure output product gas stream, the anode separator plate (or at least the portion near the opening) need not be as strong as the cathode separator plate (or at least the portion near the cathode outlet opening). For example, the distance from the anode inlet and outlet openings to the edge of the anode separator plate may be less than the distance from the cathode output opening to the edge of the cathode separator plate. In one embodiment, the distance from the anode inlet and outlet openings to the edge of the anode separator plate may be about ½-inch or less and include a groove disposed therebetween for receiving a sealing gasket. The distance from the relatively small-sized cathode output opening to the edge of the cathode separator plate may be about 1-inch including a groove disposed therebetween for receiving a sealing gasket. As noted above, the cathode fluid flow channels from the cathode outlet opening to the cathode dive through holds may be narrower and shallower to reduce stress in this region of the cathode separator plate.

Advantages of the present invention also include achieving a smaller footprint or physical size for the hydrogen pump compared to conventional hydrogen pumps. For example, a hydrogen pump in accordance with the present invention was made with an active area of 353 $cm^2$ having the same footprint as a conventional PEM fuel cell stack having an active area of 262 $cm^2$. Thus, since the active area may be made larger, fewer plates are required, thereby reducing the material and labor in assembling fewer plates, gaskets, etc. compared to conventional hydrogen pumps. In addition, tests of the cathode separator plate formed from a compression molded material resulted in the shallow narrow fluid flow channels (FIG. 7)

withstanding a pressure of about 3,000 psi, higher than other portions of the cathode separator plate. It is believed that plates constructed from metal may maintain even higher pressures.

In operation of the hydrogen pump, the anode input gas stream may be provided at about 1 psi to 2 psi and with the coolant fluid provided at about 10 psi. A pressurized and purified hydrogen-rich gas stream may be provided at 600 psi. The PEM-type hydrogen pump is desirably suitably cooled to operate at a temperature between about 20 degrees Celsius, i.e., ambient, and about 110 degrees Celsius, and preferably between about 70 degrees Celsius and about 110 degrees Celsius.

A hydrogen pump in accordance with the present invention was tested with a cathode pressure of 400 psi. It was noted that a conventional stack design having a 262 $cm^2$ active area is operable to only about 250 psi without additional clamping. The hydrogen pump also exhibited higher failure pressures of 25 percent to 110 percent than the failure pressures of a conventional hydrogen pump having a 262 $cm^2$ active area. The hydrogen pump also withstood higher loading forces without breakage of the plates due to the tie bolts passing through the plates and reducing bending moments which normally occur if the tie bolts are disposed outside the plates.

When the proton conducting electrochemical cell is operated in a hydrogen pumping mode, an input supply containing hydrogen is supplied to the anode side and a voltage potential is applied to the electrodes to cause proton pumping across the proton conducting medium. Hydrogen moves from the input stream to the porous hydrogen permeable anode electrode where the hydrogen gas forms protons (H+) and electrons. It is believed that the protons are then driven across the proton conducting medium and conducted through the nonporous hydrogen permeable cathode electrode. Molecular hydrogen is then generated in a relatively pure form on the cathode side, i.e., the output side of the electrode.

In an alternative embodiment of the present invention, a solid oxide electrolyte (e.g., zirconium oxide) may be used for the electrochemical cell. In this embodiment, the ion pump would operate in pumping oxygen and/or purifying oxygen.

In addition to the proton conducting medium including a proton exchange membrane (PEM) such as a NAFION perfluorosulfonic acid polymer membrane (available from E. I. DuPont de Nemours and Co., Wilmington, Del., USA), other proton conducting mediums may be employed such as a polybenzimidazole (PBI) polymer membrane, a polyetheretherketones (PEEK), sulfonated polysulfones, a polyimide, a hydrocarbon membrane, a polytrifluoro-styrenesulfonic acid, variations of perfluorosulfonic acid membranes, other polymeric or non-polymeric proton conductors including any strong acids. The proton conducting medium may also include solid anhydrous (e.g., not having water) proton conducting mediums, for example, solid state conductors such as inorganic and ceramic based systems, perovskite ceramics, solid-acids such as cesium dihydrogen phosphate ($CsH_2PO_4$), or other suitable solid anhydrous proton conducting mediums. Depending on the proton conducting membrane, humidification of the input gas steam may not be required. Also, depending on the proton conducting medium, the resulting pressurized and purified hydrogen-rich gas stream may also be dry as well, e.g., not contain water.

Still other alternative embodiments may include positioning a cathode outlet opening (and manifold) in the center of the separator plate to capture over-board leakage. In addition, the anode side of the cell may be operable with an input gas stream in a gas phase and provided with features to prevent blockage of water. The cathode side of the cell may be a "gas evolution" electrode.

While various embodiments of the present invention have been illustrated and described, it will be appreciated by those skilled in the art that many further changes and modifications may be made thereunto without departing from the spirit and scope of the invention.

The invention claimed is:

1. A cathode separator plate for use in an ion pump having a low-pressure input gas stream and a high-pressure output gas stream, said cathode separator plate comprising:
   a planar member comprising:
      a cathode outlet opening extending through said planar member forming a portion of a high-pressure cathode output gas stream manifold;
      at least one fluid flow channel disposed on a first surface of said planar member and connectable at one end to said cathode outlet opening;
      an anode inlet opening extending through said planar member forming a portion of a low-pressure input gas stream manifold;
      a connecting fluid flow channel having a depth that is shallower than a depth of the at least one fluid flow channel in an active region; and
      said anode inlet opening has a first size, said cathode outlet opening has a second size, and wherein said first size is larger than said second size.

2. The cathode separator plate of claim 1 wherein said cathode outlet opening comprises a single cathode outlet opening.

3. The cathode separator plate of claim 1 further comprising an anode outlet opening extending through said planar member forming a portion of an outlet for discharging the input gas stream, and wherein said anode outlet opening comprise a third size, and wherein said third size being larger than said second size.

4. The cathode separator plate of claim 1 wherein said anode inlet opening is disposed a first distance from an edge of said planar member, said cathode outlet opening is disposed a second distance from an edge of said planar member, and wherein said first distance is less than said second distance.

5. The cathode separator phase of claim 1 further comprising an anode outlet opening extending through said planar member forming a portion of an outlet for discharging the input gas stream, and wherein said cathode outlet is disposed on a first side of said planar member and said anode inlet opening and anode outlet opening are disposed a side different from said first side of said planar member.

6. The cathode separator plate of claim 1 further comprising a plurality of tie bolt openings extending through said planar member.

7. An ion pump comprising:
   an anode separator plate;
   a cathode separator plate of claim 1;
   an anode electrode disposed adjacent to said anode separator plate;
   a cathode electrode disposed adjacent to said cathode separator plate; and
   a proton conducting medium disposed between said anode electrode and said cathode electrode.

8. A hydrogen fuel infrastructure system comprising:
   an ion pump of claim 7;
   a storage tank for storing purified hydrogen from said ion pump; and
   a reformer for supplying reformate to said ion pump.

9. A method for producing pressurized hydrogen, the method comprising:
- providing a low-pressure supply containing hydrogen to an ion pump of claim 7;
- applying an electrical potential to the anode electrode and the cathode electrode;
- transferring protons through the proton conducting medium from the anode electrode to the cathode electrode; and
- receiving a high-pressure supply of purified hydrogen from the ion pump.

10. The method of claim 9 wherein the low-pressure supply is about 1 psi and the high-pressure supply is greater that about 400 psi.

11. The cathode separator plate of claim 1 wherein said at least one flow channel of said cathode separator plate are formed by lands disposed on said cathode separator plate and wherein a distance between the lands comprise about 0.040 inch.

12. The anode separator plate of claim 11 wherein said at least one flow channel of said cathode separator plate has a depth of about 0.014 inch.

13. A cathode separator plate for use in an ion pump having a low-pressure input gas stream and a high-pressure output gas stream, said cathode separator plate comprising:
- a planar member comprising:
  - an anode inlet opening extending through said planar member forming a portion of a low-pressure input stream gas manifold;
  - an anode outlet opening extending through said planar member forming a portion of an outlet for discharging the input gas stream;
  - a single cathode outlet opening extending through said planar member forming a portion of a high-pressure cathode output gas stream manifold;
  - at least one fluid flow channel disposed on a first surface of said planar member and connectable at one end to said cathode outlet opening;
  - a connecting fluid flow channel having a depth that is shallower than a depth of the at least one fluid flow channel in an active region;
  - said anode inlet opening and said anode outlet opening have a first size, said cathode outlet opening has a second size, and wherein said first size is larger than said second size;
  - said anode inlet opening and said anode outlet opening disposed a first distance from an edge of said planar member, said cathode outlet opening disposed a second distance from an edge of said planar member, and wherein said first distance is less than said second distance;
  - said cathode outlet being disposed on a first side of said planar member and said anode inlet opening and anode outlet opening being disposed a side different from said first side of said planar member; and
  - a plurality of tie bolt openings extending through said planar member.

14. An ion pump comprising:
- an anode separator plate;
- a cathode separator plate of claim 13;
- an anode electrode disposed adjacent to said anode separator plate;
- a cathode electrode disposed adjacent to said cathode separator plate; and
- a proton conducting medium disposed between said anode electrode and said cathode electrode.

15. A hydrogen fuel infrastructure system comprising:
- an ion pump of claim 14;
- a storage tank for storing purified hydrogen from said ion pump; and
- a reformer for supplying reformate to said ion pump.

16. A method for producing pressurized hydrogen, the method comprising:
- providing a low-pressure supply containing hydrogen to an ion pump of claim 14;
- applying an electrical potential to the anode electrode and the cathode electrode;
- transferring protons through the proton conducting medium from the anode electrode to the cathode electrode; and
- receiving a high-pressure supply of purified hydrogen from the ion pump.

17. The method of claim 16 wherein the low-pressure supply is about 1 psi and the high-pressure supply is greater that about 400 psi.

18. The cathode separator plate of claim 13 wherein said at least one flow channel of said cathode separator plate are formed by lands disposed on said cathode separator plate and wherein a distance between the lands comprise about 0.040 inch.

19. The anode separator plate of claim 18 wherein said at least one flow channel of said cathode separator plate has a depth of about 0.014 inch.

\* \* \* \* \*